(12) United States Patent
Panikkar et al.

(10) Patent No.: US 12,174,832 B1
(45) Date of Patent: Dec. 24, 2024

(54) INTELLIGENT DATA SIMULATOR FOR PERFORMANCE TESTING

(71) Applicant: Dell Products L.P., Round Rock, TX (US)

(72) Inventors: Shibi Panikkar, Bangalore (IN); Pratheek Veluswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/327,210

(22) Filed: Jun. 1, 2023

(51) Int. Cl.
*G06F 16/24* (2019.01)
*G06F 16/2453* (2019.01)

(52) U.S. Cl.
CPC .............. *G06F 16/24542* (2019.01)

(58) Field of Classification Search
CPC ............................. G06F 16/24542
USPC ................................. 707/715
See application file for complete search history.

(56) References Cited

U.S. PATENT DOCUMENTS

| | | | | |
|---|---|---|---|---|
| 11,436,213 B1* | 9/2022 | Waas | | G06F 40/30 |
| 2012/0173587 A1* | 7/2012 | Clifford | | G06F 11/3684 |
| | | | | 707/802 |
| 2013/0230842 A1* | 9/2013 | Elgart | | G09B 19/00 |
| | | | | 434/322 |
| 2014/0365174 A1* | 12/2014 | Arlitt | | G06Q 10/20 |
| | | | | 702/182 |
| 2018/0082197 A1* | 3/2018 | Aravamudan | | G16B 50/10 |
| 2019/0259470 A1* | 8/2019 | Olafson | | G16B 50/10 |
| 2021/0158236 A1* | 5/2021 | Bikumala | | G06N 20/10 |
| 2021/0191824 A1* | 6/2021 | Veluswamy | | G06F 11/1464 |
| 2021/0326501 A1* | 10/2021 | Lekivetz | | G06N 20/00 |
| 2021/0397972 A1* | 12/2021 | Walters | | G06N 3/047 |
| 2022/0215242 A1* | 7/2022 | Shalev | | G06N 7/01 |
| 2023/0129094 A1* | 4/2023 | Lauritzen | | G06N 3/045 |
| | | | | 707/706 |
| 2023/0222454 A1* | 7/2023 | Cella | | G06N 7/01 |
| | | | | 705/28 |
| 2023/0334169 A1* | 10/2023 | De Paepe | | G06F 21/6254 |

OTHER PUBLICATIONS

Avo Automation, "iTDM," Product Sheet, https://avoautomation.ai/itdm-product-sheet/, Jun. 15, 2022, 3 pages.
Mostly AI, "Generated Synthetic Data," https://mostly.ai, Accessed May 31, 2023, 20 pages.

(Continued)

*Primary Examiner* — Hicham Skhoun
(74) *Attorney, Agent, or Firm* — Ryan, Mason & Lewis, LLP

(57) ABSTRACT

An apparatus comprises at least one processing device comprising a processor coupled to a memory. The at least one processing device is configured to simulate a first data set stored in a first database to create a second data set, wherein the second data set maintains one or more query impacting characteristics of the first data set such that performing a query on the second data set yields a performance result similar to another performance result that would occur when the query is performed on the first data set. The at least one processing device is further configured to load the second data set into a second database, and then perform the query on the second data set stored in the second database to obtain the performance result.

18 Claims, 10 Drawing Sheets

(56) References Cited

OTHER PUBLICATIONS

Harvard Business Review Analytic Services, "The Executive's Guide to Accelerating Artificial Intelligence and Data Innovation with Synthetic Data," Briefing Paper, Sep. 2, 2021, 11 pages.

\* cited by examiner

402

| Analyze_ID | Analyze_Name | Table | Number Of Rows | Is Partitioned |
|---|---|---|---|---|
| job_234536543 | EmployeeDataLoad | Employee | 1534900 | Yes |

| Analyze_ID | Partition_Type | Partition_Name | Max Value | Min Value | Column Name | Column Value | Records | Percent |
|---|---|---|---|---|---|---|---|---|
| job_234536543 | List | emp_01 | | | Status | Permanent | 375689 | 24.48 |
| job_234536543 | List | emp_01 | | | Status | Contract | 786546 | 51.24 |
| job_234536543 | List | emp_01 | | | Status | Expired | 372665 | 24.28 |

| Analyze_ID | Partition_Type | Partition_Name | MaxValue | MinValue | ColumnName | Column Value | Records | Percent |
|---|---|---|---|---|---|---|---|---|
| job_546536543 | Hash | dept_01 | 123434 | 0 | DeptName | | 23546 | 10.03 |
| job_546536543 | Hash | dept_02 | 234546 | 123434 | DeptName | | 53546 | 22.82 |
| job_546536543 | Hash | dept_03 | 345647 | 234546 | DeptName | | 157583 | 67.15 |
| job_886536543 | Range | Create_Date_01 | 2-Aug-13 | 2-Aug-12 | Created_Date | | 23546 | 10.03 |
| job_886536543 | Range | Create_Date_02 | 2-Aug-12 | 2-Aug-11 | Created_Date | | 53546 | 22.82 |
| job_886536543 | Range | Create_Date_03 | 2-Aug-14 | 2-Aug-13 | Created_Date | | 157583 | 67.15 |

| Analyze_ID | NonUniqueIndexName | ColumnName | ColumnValue | NumberOfRecords |
|---|---|---|---|---|
| job_234536543 | Job_Indx | Job_Id | 10 | 375689 |
| job_234536543 | Job_Indx | Job_Id | 20 | 323465 |
| job_234536543 | Job_Indx | Job_Id | 30 | 420987 |
| job_234536543 | Job_Indx | Job_Id | 40 | 414759 |
| job_234536543 | dept_Indx | dept_id | 10 | 375689 |
| job_234536543 | dept_Indx | dept_id | 20 | 323465 |
| job_234536543 | dept_Indx | dept_id | 30 | 420987 |
| job_234536543 | dept_Indx | dept_id | 40 | 414759 |

| Analyze_ID | ColumnNames | Data Type | Max_Length | Decimal | Constraint | Function_Name | FunctionExecute |
|---|---|---|---|---|---|---|---|
| job_234536543 | Employee_ID | Number | 6 | | PrimaryKey | Sequence | EmpSequence |
| job_234536543 | Dept_ID | Number | 6 | | ForiegnKey | Index | |
| job_234536543 | Status | Varchar2 | 30 | | ForiegnKey | Partition | |
| job_234536543 | Job_ID | Varchar2 | 10 | | ForiegnKey | Index | |
| job_234536543 | Manager_ID | Varchar2 | 6 | | ForiegnKey | List | |
| job_234536543 | First_Name | Varchar2 | 20 | | Non-Unique | AsFromSource | |
| job_234536543 | Last_Name | Varchar2 | 25 | | Non-Unique | Scrambled | |
| job_234536543 | Salary | Number | 8 | 2 | Non-Unique | Scrambled | |
| job_234536543 | Commission_Perc | Number | 2 | 2 | Non-Unique | Random | |
| job_234536543 | Employee_Height | Number | 3 | 2 | Non-Unique | DB_FUNC | GetEmpHeight |
| job_234536543 | Employee_Weight | Number | 3 | 2 | Unique | Random | |
| job_234536543 | Employee_lincese | Varchar2 | 50 | | Unique | Similar | 64bytes encoded |

FIG. 4E

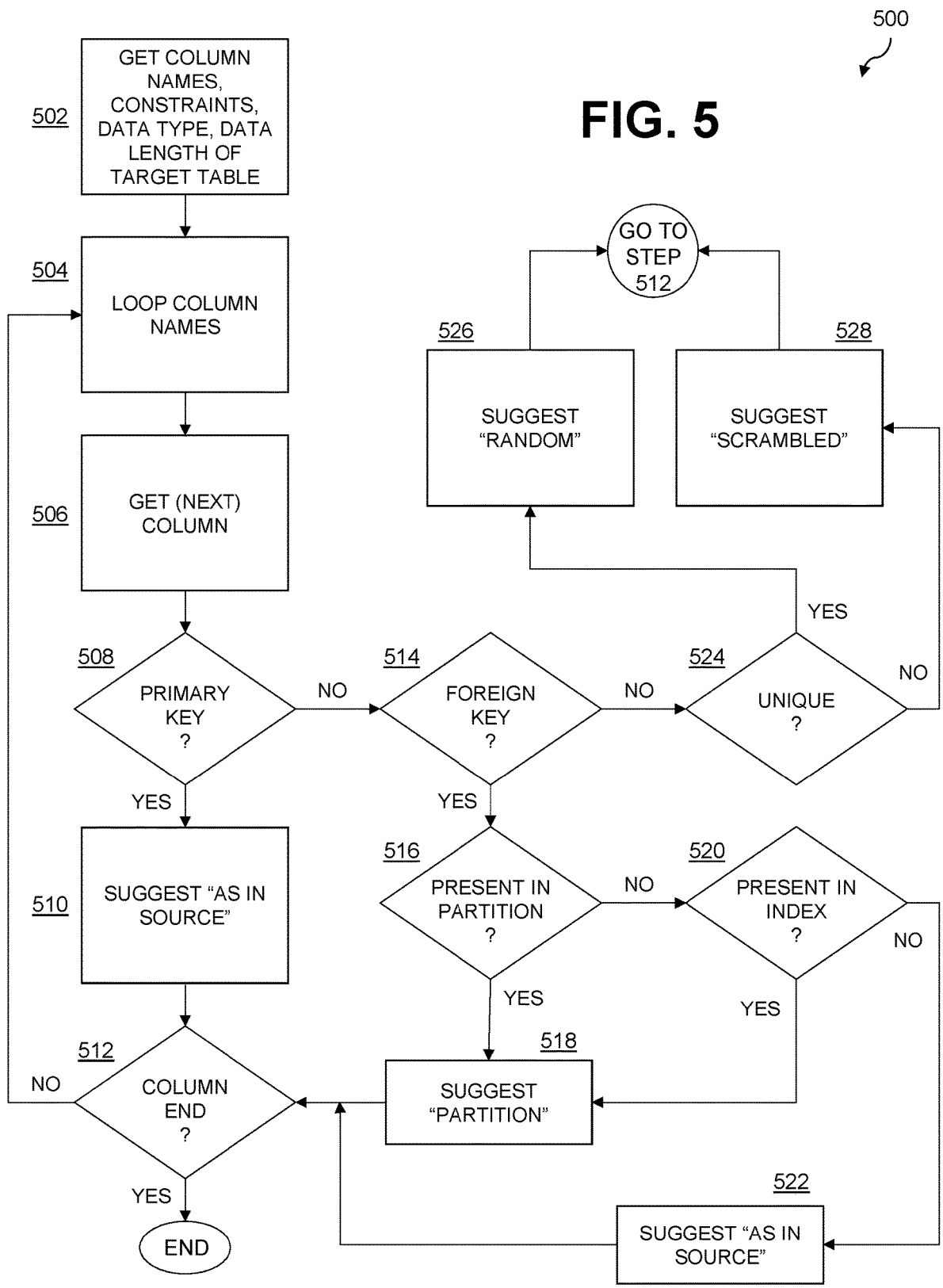

FIG. 6

INTELLIGENT DATA SIMULATOR FOR PERFORMANCE TESTING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to techniques for managing data.

BACKGROUND

Performance testing (e.g., capacity testing, load testing, volume testing, stress testing, soak testing) is a vital part in the testing phase in the software industry to ensure the performance of an application or other software in a production environment (e.g., a real time customer database). It is realized that performance testing demands an adequate quality of data that accurately reflects the data used and/or produced by an application being tested.

A previous industry approach, for example, obtained a data dump of a production database and simply masked the customer fields for the performance testing. With new data security rules, the utilization of actual production data in the testing environment, albeit masked to some degree, is typically not permissible.

However, the software industry has evolved with numerous test data generators configured to generate synthetic data rather than using actual production data. Such synthetic data is production-like data that can be used in a testing environment. However, synthetic data generation, while providing an advantage over the production data dump approach, still presents significant challenges to software developers with regard to performance testing.

SUMMARY

Illustrative embodiments provide techniques for intelligent data simulation for performance testing.

In one embodiment, an apparatus comprises at least one processing device comprising a processor coupled to a memory. The at least one processing device is configured to simulate a first data set stored in a first database to create a second data set, wherein the second data set maintains one or more query impacting characteristics of the first data set such that performing a query on the second data set yields a performance result similar to another performance result that would occur when the query is performed on the first data set. The at least one processing device is further configured to load the second data set into a second database, and then perform the query on the second data set stored in the second database to obtain the performance result.

Advantageously, illustrative embodiments enable improved performance testing that can include, but is not limited to, one or more of capacity testing, load testing, volume testing, stress testing, and soak testing. More particularly, by accounting for one or more query impacting characteristics in the data generation, illustrative embodiments enable performance testing on a target data set that accurately replicates the source data.

These and other illustrative embodiments include, without limitation, methods, apparatus, networks, systems and processor-readable storage media.

BRIEF DESCRIPTION OF THE DRAWINGS

FIGS. 4A through 4E depict an example of intelligent data suggestion according to one or more illustrative embodiments.

FIG. 5 further depicts intelligent data suggestion according to one or more illustrative embodiments.

FIG. 6 depicts an exemplary user interface configured to enable user management of results generated using intelligent data suggestion according to one or more illustrative embodiments.

DETAILED DESCRIPTION

Figure 1:
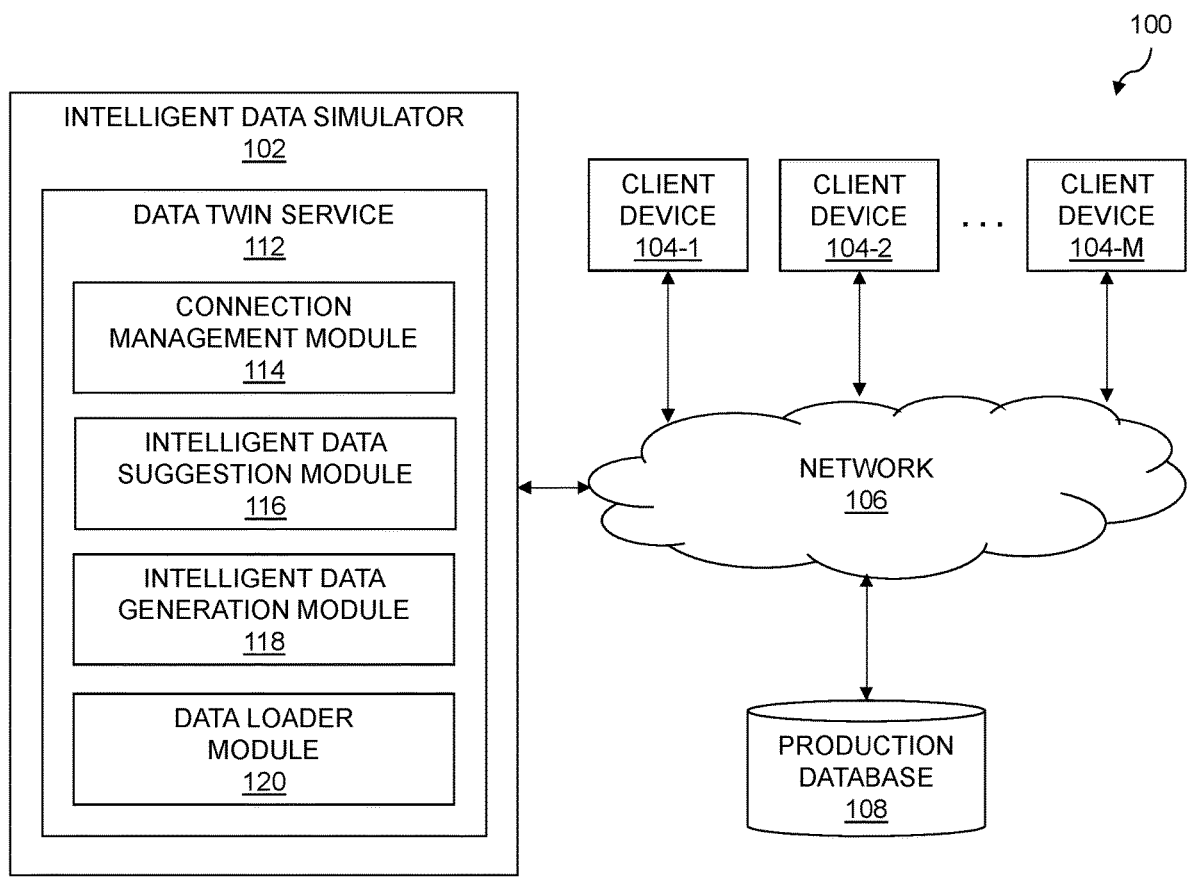
FIG. 1 depicts an information processing system configured for intelligent data simulation for performance testing according to one or more illustrative embodiments.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As mentioned, numerous synthetic test data generators have been proposed to generate synthetic data rather than using actual production data for performance testing. These existing test data generators use artificial intelligence (AI) based methods to generate synthetic data. However, it is realized herein that while the AI-based test data generator approach may be adequate for capacity testing, volume testing, and soak testing, such synthetic data in a testing environment will not guarantee the same query response in the production environment, which is important for the load testing and stress testing. For example, in each database, a query response depends on different factors such as partitions (e.g., list partition, range partition, etc.) and indexes (e.g., unique and non-unique indexes, clustered index, hash index, range index, etc.). Also, there are several query parameter setups (e.g., hints, etc.) that can affect a query response.

It is further realized herein that accurate load testing and stress testing results demand almost exact production-like data along with the production data structure, indexes (different types) on the table and the data falling in that index, and partitions (different types) data behavior in the database and the number of rows in the partitions, etc.

It is also realized herein that the data that is synthesized should fall under the criteria of these partitions and indexes. The synthetized database should have the same amount and nature of data in different partitions, indexes, and all columns, and it should have the same data behavior as in the production environment to react to structured query language (SQL) queries in the same or similar way as would occur in the production environment.

While existing AI-based synthetic data generators try to generate similar data based on a source sample with some referential integrity relationship, the generated data typically does not fall under the same partitions or indexes as of the production data. For example, assuming that a given partition in the production database has 3 million records, synthetic data generated by existing AI-based tools can have totally different records in that synthesized partition. Thus, none of the existing AI-based data synthesis generates a level of accurate representation that will guarantee the same (or near same) response time for a database query. So, currently, once the data is synthesized in a performance testing environment using an existing AI-based approach, a significant amount of manual effort is spent on the testing environment to: (i) create partitions as in the production environment and keep the same amount of data in each partition; (ii) maintain the same behavior of the data in each partition; and (iii) create indexes and keep the same amount of data for those indexed columns as in the production environment.

To make the query response time similar to production, using an existing AI-based approach, takes a considerable amount of time. Another issue (gap in the existing process) is if the existing AI-based tool is re-run, all of the manual work needs to be performed again, as new data generated will not fall under the same partitions or indexes manually created earlier.

Another issue with existing AI-based tools is that since it attempts to generate data that is similar to the production environment, this can involve synthesizing a data set of significant size. In load testing and stress testing, the non-indexed, non-partitioned, non-referential table data can be anything (scrambled data) falling under the same data behavior.

Illustrative embodiments overcome the above and other technical drawbacks in existing data generation approaches for performance testing. More particularly, illustrative embodiments generate production-like data which behaves the same way in non-production in terms of query performance by understanding the performance impacting characteristics of the database, and then creating data to adhere to the database impacting characteristics in production. Illustrative embodiments may refer to generated data as a "data twin" of the production data in the database.

FIG. 1 shows an information processing system 100 configured in accordance with an illustrative embodiment to provide functionality for intelligently generating test data for production database performance testing operations. The information processing system 100 includes an intelligent data simulator 102 and a plurality of client devices 104-1, 104-2 . . . 104-M (collectively client devices 104). The intelligent data simulator 102 and client devices 104 are coupled to a network 106. Also coupled to the network 106 is a production database 108.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those ordinarily skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The data generated by intelligent data simulator 102 is considered a "data twin" of data stored in production database 108 in that the generated data is production-like data which behaves the same way in a non-production setting (i.e., performance testing) in terms of query performance by understanding and adhering to the production database performance impacting characteristics of the data in production database 108.

Although not explicitly shown in FIG. 1, one or more input-output devices such as keyboards, displays or other types of input-output devices may be used to support one or more user interfaces to the intelligent data simulator 102, as well as to support communication between intelligent data simulator 102, one or more client devices 104, production database 108, and/or other related systems and devices not explicitly shown.

The term "user" herein is intended to be broadly construed so as to encompass numerous arrangements of human, hardware, software or firmware entities, as well as combinations of such entities.

As further shown, intelligent data simulator 102 comprises a data twin service 112 which is configured to generate a production-like copy of data stored in production database 108. In illustrative embodiments, the generated production-like data (data twin) is to be used for accurate performance testing of the production database (e.g., capacity testing, load testing, volume testing, stress testing, soak testing). Data twin service 112 comprises a connection management module 114, an intelligent data suggestion module 116, an intelligent data generation module 118, and a data loader module 120. Each module and its interactions with one or more other modules will be further explained herein below.

It is to be understood that the particular components shown in FIG. 1 are presented by way of illustrative example only, and in other embodiments additional or alternative components may be used. Thus, another embodiment may include additional or alternative systems, devices and other network entities, as well as different arrangements of modules and other components.

At least portions of data twin service 112 (e.g., connection management module 114, intelligent data suggestion module 116, intelligent data generation module 118, and data loader module 120) may be implemented at least in part in the form of software that is stored in memory and executed by a processor. Further, data twin service 112, and other portions of the system 100 may, in some embodiments, be part of cloud infrastructure as will be described in further detail below. The cloud infrastructure hosting data twin service 112 may also host any combination of intelligent data simulator 102, one or more of the client devices 104, production database 108, etc.

Data twin service 112, and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources. Further, data twin service 112, and other components of the information processing system 100 in the FIG. 1 embodiment may be implemented on respective distinct processing platforms, although numerous other arrangements are possible.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of information processing system 100 for the client devices 104 and data twin service 112, or portions or components thereof, to reside in different data centers. Numerous other distributed implementations are possible. Data twin service 112 can also be implemented in a distributed manner across multiple data centers. Additional examples of processing platforms utilized to implement data twin service 112 in illustrative embodiments will be described in more detail below in conjunction with FIGS. 8 and 9.

Figure 2:
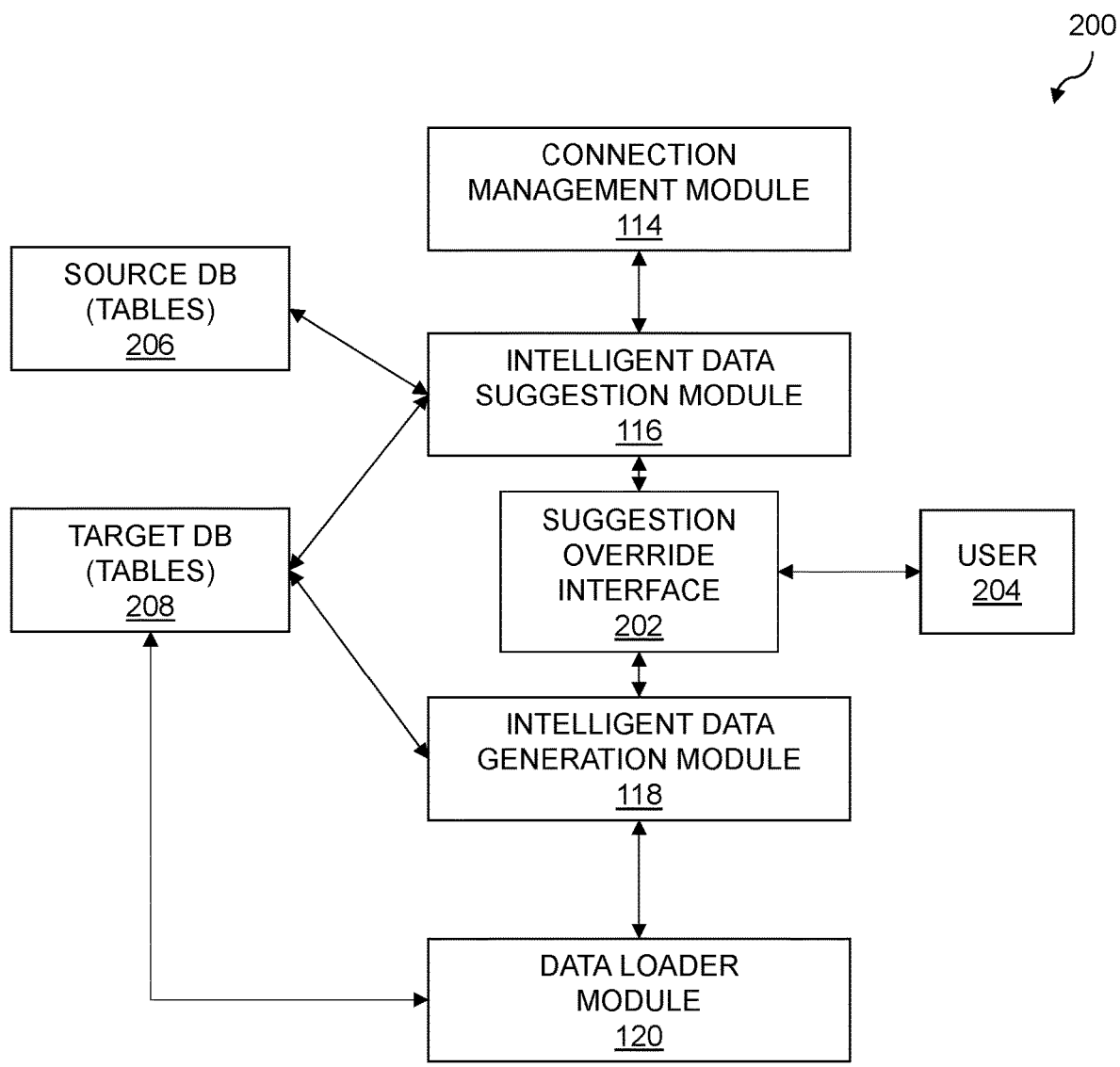
FIG. 2 depicts an intelligent data simulation architecture according to one or more illustrative embodiments.

Turning now to FIG. 2, an intelligent data simulation architecture 200 is depicted according to one or more illustrative embodiments. More particularly, intelligent data simulation architecture 200 depicts further details of data twin service 112 associated with intelligent data simulator 102 of FIG. 1. Thus, connection management module 114, intelligent data suggestion module 116, intelligent data generation module 118, and data loader module 120 are operatively coupled as shown. Further, as will be explained below, intelligent data simulation architecture 200 also comprises a suggestion override interface 202 (assumed to be part of data twin service 112 in some embodiments) through which a user 204 (e.g., associated with at least one of client devices 104 of FIG. 1) can cancel (override), accept, and/or modify results generated by intelligent data suggestion module 116 before having the data generated by intelligent data generation module 118.

Further, in intelligent data simulation architecture 200, a source database (DB) 206 is operatively coupled to intelligent data suggestion module 116, and a target DB 208 is operatively coupled to intelligent data suggestion module 116, intelligent data generation module 118, and data loader module 120. By way of example only, with respect to a Structured Query Language (SQL) database implementation, source DB 206 may typically have a data structure comprising one or more source tables and target DB 208 may typically have a data structure comprising one or more target tables. It is to be appreciated that source and target tables are assumed to have the same schema and data structure type, and in some embodiments can be part of the same database system.

As mentioned above, in accordance with one or more illustrative embodiments, to accurately replicate the data in production database 108 as a data twin for use in performance testing, it is desirable to enable different types of data generation. For example, for performance testing, data twin service 112 may generate one or more of: (i) the as-is data from production for some columns (e.g., primary key); (ii) similar behaving data (e.g., generated through AI or similar logic) for some columns (e.g., indexed columns or partitioned columns); (iii) unique values for specific columns within the data range of production; (iv) random string or numbers for some columns (e.g., columns that do not drive query performance); (v) scrambled data similar to production (e.g., name, country etc., which will not drive query performance); and (vi) columns needing user defined functions (e.g., encrypted license key).

Accordingly, as will be explained in further detail herein, intelligent data suggestion module 116 analyzes the structure of the production database, e.g., database metadata definition(s), and suggests the appropriate (e.g., best, suitable, satisfactory, etc.) data generation type for each column in the production database in order to accurately simulate the production data. For example, intelligent data suggestion module 116 can obtain query performance impacting parameters such as behavioral data from source DB 206 and table definitions, partitions, indexes, and constraints from target DB 208, as well as other parameters.

Assuming that user 204 accepts the suggestion results from intelligent data suggestion module 116 and does not override them via suggestion override interface 202, intelligent data generation module 118 reads the suggestion results and generates the data, according to at least a portion of the suggestion results, in a manner that maintains the query performance impacting parameters. The data generated by intelligent data generation module 118 is then loaded by data loader module 120 into the target DB 208. Performance testing can then be performed against the target DB 208.

Advantageously, since each database has its own particular way of storing and retrieving data and since performance of a query depends on how each database stores and indexes data, intelligent data simulation architecture 200 first reads different aspects of the data definition that impact query performance in the production database, and then generates appropriate data for performance testing based on at least a portion of the query impacting parameters. As such, the data generated by intelligent data simulation architecture 200 is considered a data twin of the production data.

Note that connection management module 114 enables intelligent data simulation architecture 200 to connect with different databases (source and target) based on the connectivity protocol of each database. By way of example only, connection management module 114 can provide for security access mechanisms (e.g., usernames, passwords, etc.) to enable access management for the databases. However, other connectivity functionalities can be configured in connection management module 114.

Figure 3:
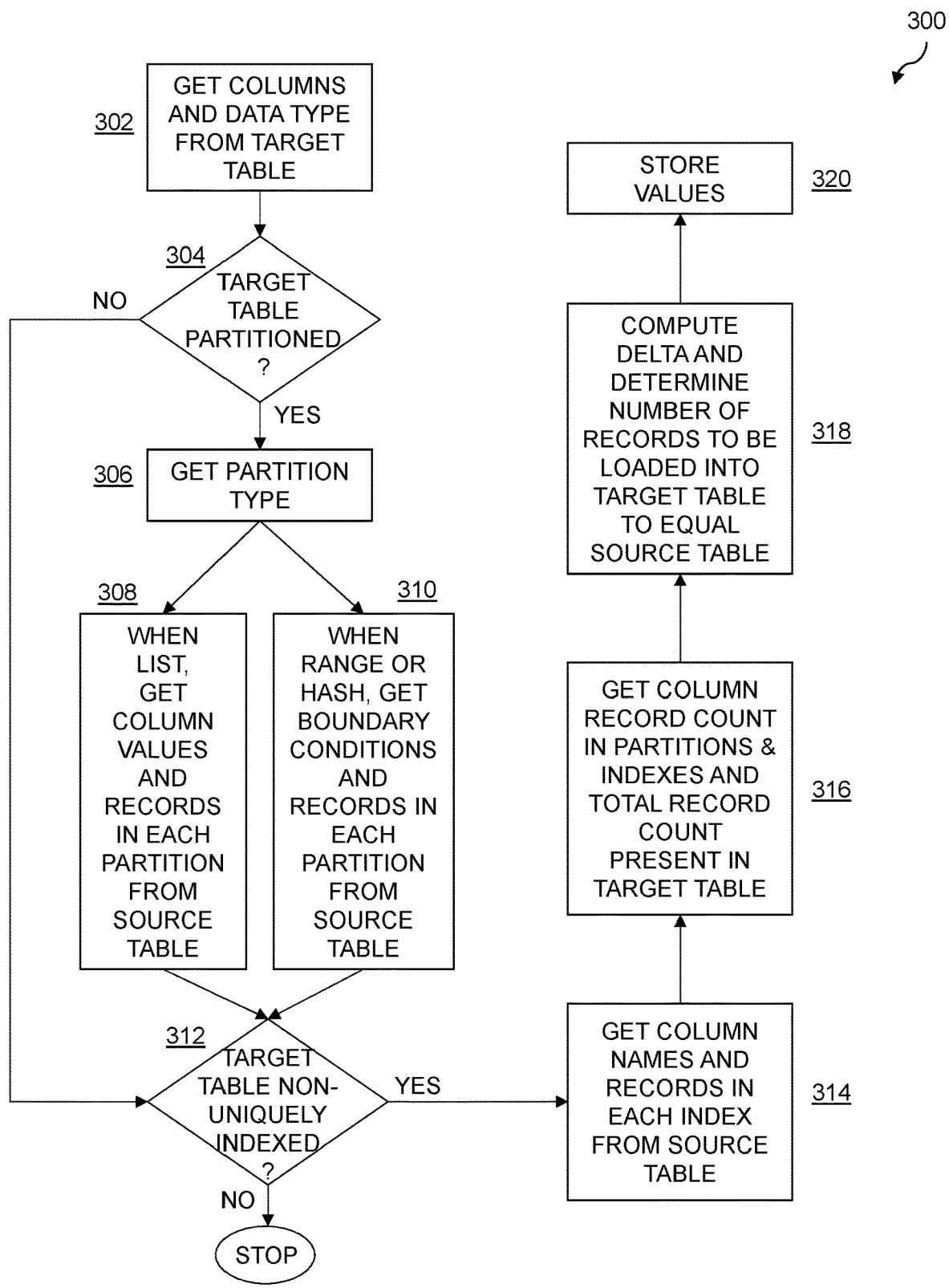
FIG. 3 depicts intelligent data suggestion according to one or more illustrative embodiments.

FIG. 3 depicts an intelligent data suggestion process 300 according to one or more illustrative embodiments. By way of example, intelligent data suggestion process 300 can be performed by intelligent data suggestion module 116. As mentioned, it is realized herein that different partitions and different types of indexes, among other parameters, drive the way data is stored in a production database and thus the performance of a query. Illustrative embodiments first read the storing parameters and boundary conditions of the parameters (e.g., min value and max value) as well as the number of records present in each parameter (e.g., number of records in each partition, number of records in each index, etc.). It is assumed here that the source database and the target database have the same partitioning and indexing of columns. With this collected data, illustrative embodiments can then run logic to find the type of data to be loaded in each column of the target database. In intelligent data suggestion process 300, "source table" refers to a table in source DB 206, while "target table" refers to a table in target DB 208.

For example, as depicted in FIG. 3, intelligent data suggestion process 300 get columns and data type from the target table in step 302. Step 304 checks whether the target table is partitioned. If no in step 304, then intelligent data suggestion process 300 goes to step 312 as will be described below. However, if yes in step 304, step 306 gets the partition type (e.g., list partition, range partition, hash partition, etc.). When the partition type is a list, step 308 gets column values and records in each partition from the source table. When the partition type is a range or a hash, step 310 gets boundary conditions and records in each partition from the source table.

Step 312 then checks whether the target table is non-uniquely indexed. If no in step 312, then intelligent data suggestion process 300 stops. However, if yes in step 312, step 314 gets column names and records in each index from the source table. Step 316 gets the column record count in the partitions and indexes, and the total record count present in the target table. Step 318 then computes the delta between the source table and target table to determine the number of records to be loaded into the target table to equal the source table. Based on the computed delta, step 320 stores all values in the target table.

FIGS. 4A through 4E depict an example of intelligent data suggestion process 300 according to one or more illustrative embodiments.

As shown in table 402 of FIG. 4A, intelligent data suggestion process 300 stores an identifier and a name for the given analysis, as well as a name and a number of total rows in the source table, and whether the table is partitioned. In this example, intelligent data suggestion process 300 stores this information in a table form (other alternatives may be used, e.g., XML). Then, intelligent data suggestion process 300 stores all partition details in another table, e.g., as shown in table 404 of FIG. 4B for a list partition. In the case of a hash partition or range partition, the table may look as shown in table 406 of FIG. 4C. As then shown in table 408 of FIG. 4D, intelligent data suggestion process 300 stores the index details for the given analysis. Further, as shown in table 410 of FIG. 4E, intelligent data suggestion process 300 then stores the data definition (e.g., column details) of the target database.

Note that the constraint column in table 410 specifies the constraint for that column in the table such as primary key, foreign key, unique, and non-unique. By way of example only, a primary key uniquely identifies a row in a table, while a foreign key is used to link two tables together by referencing the primary key of the related table. While a primary key is used to uniquely identify a row, a unique key is used to prevent duplicate values in a column. A table can have only one primary key, but the table can have multiple unique keys. On the other hand, non-unique keys can produce duplicate rows with respect to these keys.

The stored data will then be used to drive data generation by intelligent data generation module 118.

As is evident, according to the constraint, partition details, and index details, intelligent data suggestion process 300 suggests different function names in table 410 that effectuate different generation scenarios with respect to intelligent data generation module 118. For example:
  (i) Sequence-intelligent data generation module 118 will use the DB sequence whose name is in the FuctionExecute column of table 410.
  (ii) Index-intelligent data generation module 118 will use the index data store for generating data for this column.
  (iii) Partition-intelligent data generation module 118 will use partition data store for generating data for this column. In the partition type is list, then the data will be replicated with the list, and if the partition type is range or hash, the MinValue and Max Value will be used to generate data with unique random values inside the range.
  (iv) List-user will define the list of values for this column with percentage of data distribution. Intelligent data generation module 118 will use this data for generating data for this column.
  (v) AsFromSource-intelligent data generation module 118 will use the source table to get the data (from production) only for this column.
  (vi) Scrambled-intelligent data generation module 118 will use the existing data in the target table to generate more data adhering to data type and length.
  (vii) Random-intelligent data generation module 118 will use a random data generator to generate data for this column to adhering data type and length.
  (viii) DB_FUNC-intelligent data generation module 118 will use a user defined DB function for data for this column.
  (ix) Similar-based on the AI training of the data, i.e., with the pattern, the model determines what type of data it is. The model can be used to classify data as license key, encoded, blob, clob, etc.

For primary key and unique constraints in table 410, intelligent data generation module 118 generates a unique value according to the data type. Further, intelligent data generation module 118 is enabled to take data from the source table as is (if data security policy allows), else it will generate data according to the data type and boundary condition as follows:
  (i) Similar: based on AI, similar data is generated.
  (ii) Random: random values are generated within the data type of the column.
  (iii) Sequence: the user defines a sequence in the database or an existing sequence. For the foreign key constraint in table 410, the column is constrained to use values in the parent table's primary keys. To do so, intelligent data generation module 118 will need to know the distribution of this value in the source table.

Intelligent data generation module 118 now has all columns:
  (i) Data count in different partitions and indexes.
  (ii) Data count of columns not present in partition or indexes.

(iii) Behavior as min length and max length, unique, non-unique, primary key, foreign key, and the way to generate the data which will behave exactly the same (or substantially similar) as the source table (production data).

(iv) Data distribution in case of list, range, hash partition, and range index.

(v) Get the existing count of data in the target table for all columns. Thus, the actual number of data records to be loaded is: "Existing Data Count in Source (Production)"—"Existing Data Count in Target (Performance Testing Environment)." This is considered the delta.

Now, based on the data gathered, intelligent data suggestion module 116 can suggest the data generation method as depicted in FIG. 5.

FIG. 5 depicts intelligent data suggestion process 500 according to one or more illustrative embodiments. By way of example, intelligent data suggestion process 500 can be performed by intelligent data suggestion module 116.

As shown, step 502 gets columns names, constraints, data type and data length of the target table. Steps 504 and 506 create an iterative loop based on column names. Thus, for the given column name in the given iteration, step 508 determines if the constraint is a primary key. If yes in step 508, step 510 suggests to use the data from the source table (i.e., as is/as in the source). Step 512 then determines if this is the last column. If yes in step 512, then intelligent data suggestion process 500 ends. If no in step 512, intelligent data suggestion process 500 returns to step 504 so that step 506 can get the next column.

Referring back to step 508, if the constraint is not a primary key, step 514 determines if the constraint is a foreign key. If yes in step 514, step 516 determines if the foreign key is present in the partition. If yes in step 516, step 518 suggests to use the partition data store for generating data for this column. Step 512 then determines if this is the last column and, if so, intelligent data suggestion process 500 stops, else it continues to loop on the next column. If no in step 516, step 520 determines if the foreign key is present in the index. If yes in step 520, step 518 suggests to use the partition data store for generating data for this column. Step 512 then determines if this is the last column and, if so, intelligent data suggestion process 500 stops, else it continues to loop on the next column. If no in step 520, step 522 suggests to use the data from the source table (i.e., as is/as in the source). Step 512 then determines if this is the last column and, if so, intelligent data suggestion process 500 stops, else it continues to loop on the next column.

Referring back to step 514, if the constraint is not a foreign key, step 524 determines if the constraint is a unique key. If yes in step 524, step 526 suggests to use a random data generator to generate data for this column. If no in step 524, step 528 suggests to use the existing data in the target table to generate the data or this column. Step 512 then determines if this is the last column and, if so, intelligent data suggestion process 500 stops, else it continues to loop on the next column.

Figure 6:
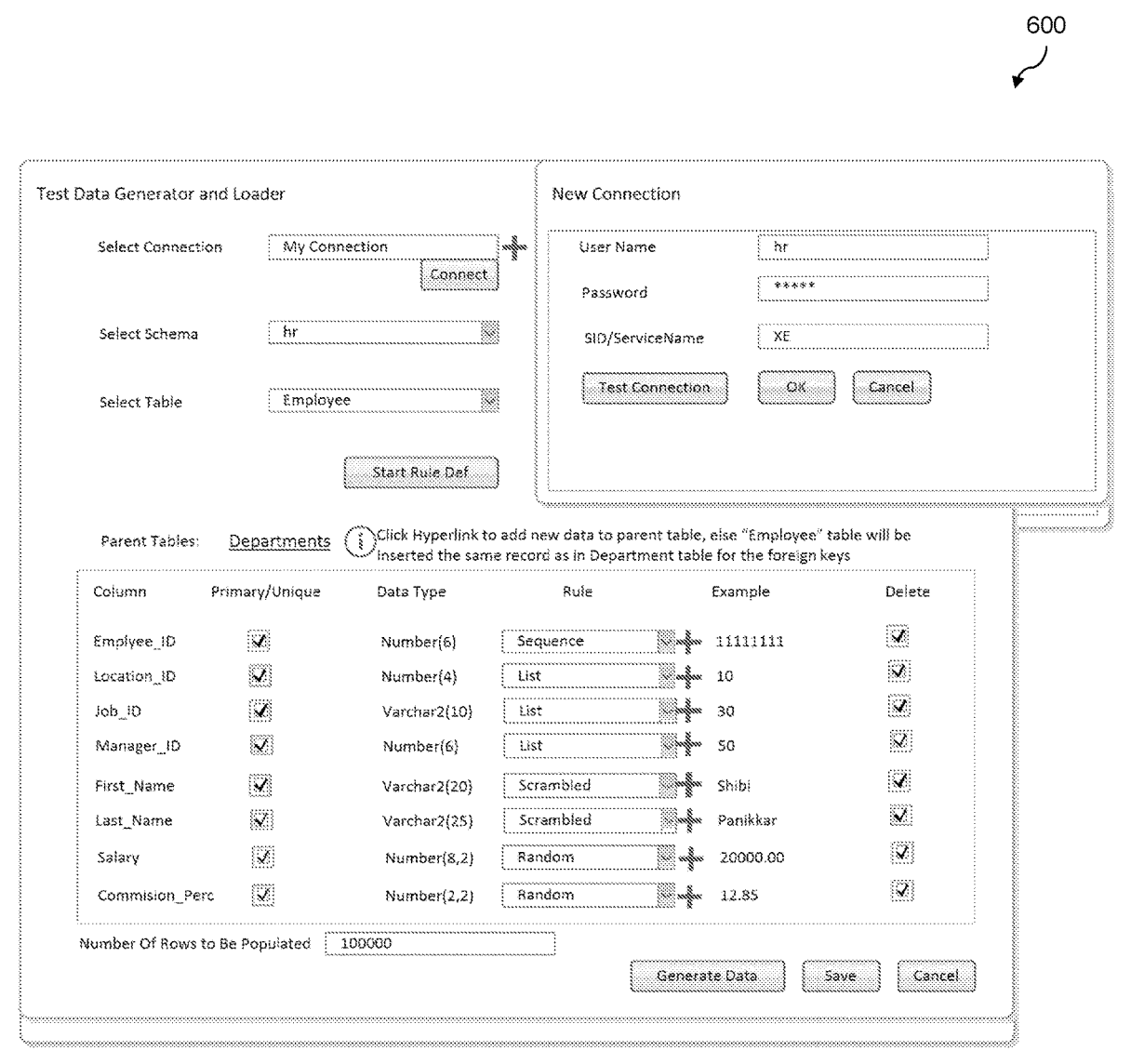

Accordingly, after intelligent data suggestion process 500 is completed, suggestion override interface 202, an example of which is depicted as a user interface (UI) grid 600 in FIG. 6, shows all suggestion that were made by intelligent data suggestion process 500. Using UI grid 600, user 204 can override some or all suggestions and/or create (e.g., add, modify) one or more suggestions (e.g., data seeds).

Using the suggestions and/or user-defined data seeds, intelligent data generation module 118 generates the data for individual columns, adhering to the data type and constraints put forward by intelligent data suggestion module 116. More particularly, in illustrative embodiments, for each Function_Name (see table 410), there is one corresponding function in intelligent data generation module 118 to produce the data. By way of example only, below are exemplary functions to generate the data:

1. AsInSource (String ColumnName,String DataType, Integer numberOfRows)—This will query the source table (production database, using the readonly access) and get values.

2. GetDataByIndexStore (String suggestionID, String ColumnName)—
  Function_Name: Index
   a. Get the column details from index store against the suggestion_id and column_name.
   b. Get the different data value and number of rows against that column_name.
   c. Replicate those values number of times the rows specified.

3. GetDataByPartition (String suggestionID, String ColumnName)
  Function_Name: Partition
   a. Get the column details from partition store against the suggestion_id and column_name.
   b. Get the different data value and number of rows against that column_name.
   c. Replicate those values number of times the rows specified.

4. GetDataBySequence (String sequenceName, Integer NumberOfRows)—Function_Name:
  Sequence, Fucntion_Execute: sequenceName
   a. Execute the sequence (sequenceName) "NumberOfRows" times and return values.

5. getDataBy List (Dictionary valueCountCollection)—This dictionary will contain the user defined list of values as keys, and number of rows needed as "value" of dictionary. This function will replicate value, number of rows times.

6. getDataBy Scrambling (String ColumnName, Integer NumberOfRows)
   a. Get distinct (ColumnName) where rownum<NumerOfRows*20/100
   b. Replicate the values 5 times.

7. getStringByRandom (Integer MinLength, Integer MaxValue, Boolean isUnique, Integer NumberOfRecords)
   a. If isUnique==true, then generate unique GUID with restricted length.
   b. Else, Function can generate any string with restricted length.

8. getNumberByRandom (Integer MinLength, Integer Max Value, Integer Precision, Boolean isUnique, Integer NumberOfRecords)
   a. If isUnique==true, then generate unique GUID with restricted length, and precision.
   b. Else, function can generate any integer with restricted length and precision.

9. getDataByDBFunction (String DBFunctionName)—This will call the DBFunctionName (User Defined Function) passed to get data for then column.

10. getDataBySimilar (String ColumnName,String DataType, Integer numberOfRows, String SampleData)—This will use the existing AI techniques to generate similar data of the production.

Using these functions, intelligent data generation module 118 generates the data for all columns and, in some embodiments, this can be added into an XML/Json file so that data loader module 120 can load this into the database for performance testing.

It is to be appreciated that the data generated by intelligent data generation module 118 can be huge, e.g., in the millions of records. If data loader module 120 inserts and commits this data as bulk, there can be significant disk swaps, loading times will be very long, and the data loading may be adversely affecting other transactions in the same table.

However, it is realized that, in accordance with illustrative embodiments, each and every insert can be committed, while still maintaining performance. With the current state of the database, if the optimal size for commit is known, user 204 can set the optimal size, and intelligent data simulation architecture 200 can compute back the number of rows required for that size.

According to one or more illustrative embodiments, an exemplary code implementation for intelligent data simulation architecture 200 is shown below.

It is realized herein that intelligent data suggestion module implementation would be different depending on the given production database application. Assume by way of example only that the production database is an Oracle database being used for storing and querying data stored in Employee, Department Table as an example.

First, a check is made that the data definition language (DDL) of the production (source) and the target is the same including partitions, indexes, primary key, foreign key, etc. Now, the target table can be used to collect all parameters of tables required for the data suggestion. For example:

1. Get all columns, and data type of the table:
SELECT table_name, column_name, data_type, data_length
  FROM ALL_TAB_COLUMNS
  WHERE table_name='EMPLOYEES'
2. Check if table is partitioned:
Select count (1) into numberOfPartitions from ALL_PART_TABLES where table_name=<Table_Name>
If (numberOfPartitions==0){
Table is partitioned
}else{
Table is not partitioned}
3. If partitioned, get details of partition and local indexes if any:
Select partition_type,sub_partitioning_type, PARTITION_COUNT into PartitionType, subPartition_type, Partition_Count from ALL_PART_TABLES where table_name=<Table_Name>
Select PARTITION_NAME, HIGH_VALUE, HIGH_VALUE_LENGTH into PartitionName, highValue, highValueLength from ALL_TAB_PARTITIONS where table_name=<Table_Name>
4. Find column name of the partition:
Select column_name from ALL_PART_KEY_COLUMNS where NAME=<PartitionName> and OBJECT TYPE='TABLE'
5. Get number of rows in each partition:
Select count (*) from employees partition (<PartitionName>)
6. In case of PartitionType="List" (List partition):
a. Get Column Names from Step 3
b. Get distinct values in column Name in each partition
   Select distinct columnName into ColumnCollection from employees partition (<PartitionName>)
If ColumnCollection has more than one value then
   Get the count of each value in that partition
      Get the % of data distribution inside partition (currentValue/TotalRows (From step 4) for each value
      Get Max and Min Length of Values of Each Partition
      Select Min (columnName) into MinColumnValue from employees partition (<PartitionName>);
Select Max (columnName) into MinColumnValue from employees partition (<PartitionName>);
7. In case of Partition Type="Range" (Range partition)
a. Get High Value of Each Partition (From Step 3)
b. Get Min Value Comparing Other Partitions (High Value of Second-High Value of First will be the Min Value of Second)
c. Get Number of Rows in each partition
8. In case of PartitionType= "Hash" (Range partition)
a. Get HighValue of Each Partition (From Step 2)
b. Get Min Value Comparing other Partitions (HighValue of Second–High Value of First will be the Min Value of Second)
c. Get Number of Rows in each partition The exemplary code implementation also determines if any non-unique indexes are in the table:
Select count (*) into indexPresent from all_indexes where table_name='EMPLOYESS' and uniqueness='NONUNIQUE'
If indexPresent>0 the
Non Unique index present
Else
Not Present
If (Non Unique index present){
Get all non-unique index names
Select distinct index_name from all_indexes where table_name='EMPLOYESS' and uniqueness='NONUNIQUE'
Get column name for that index name:
Select column_name from all_ind_columns where table_name='EMPLOYEES' and index name='EMP DEPARTMENT IX'
}
Get count of records in all distinct values of those column names:
Select count (*), <column_name> into numberOfRecords, columnName from employees group by <column_name>
Get all columns of the table and data type and constraints. If there is a foreign key, get the primary table. Inquire with user, if user wants to load data in that table before loading to this table:
SELECT owner,table_name
FROM user_constraints
WHERE constraint_name IN (SELECT r_constraint_name
FROM user_constraints
WHERE owner='SCOTT' AND table_name='EMP' AND constraint_type='R');

Now, all partitions, indexes, and constraints are in the Employee and Department tables.

Then, the records from production are obtained for these two takes along with the record count in each partition and index.

Intelligent data generation module 118 then generates the data in an XML/Json format and data loader module 120 then loads the data into the target table.

Advantageously, as described herein, illustrative embodiments enable a data twin concept with a different set of data in different tables (data store) in different database instances with the same data characteristics that provides the same query response time. Thus, illustrative embodiments provide an intelligent way to generate a data twin for performance testing from a production database and a database meta data definition.

Figure 7:
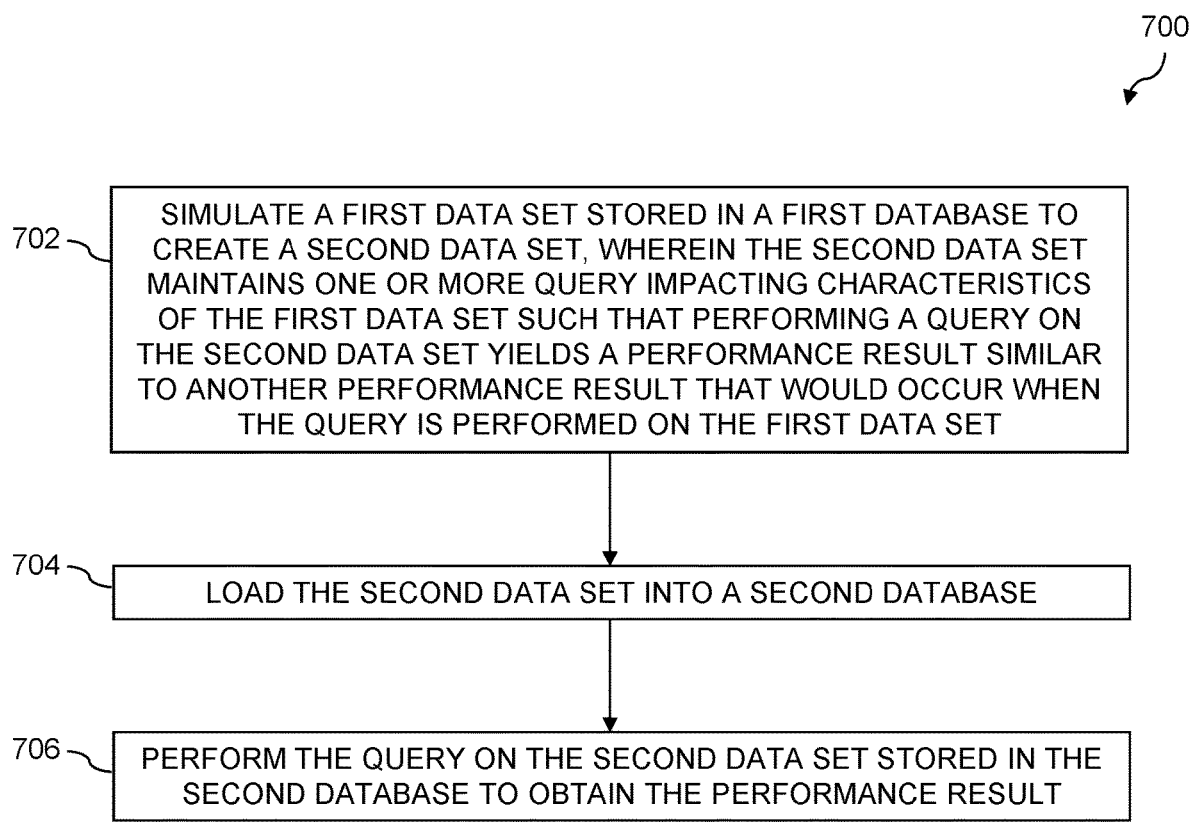
FIG. 7 depicts an intelligent data simulation methodology according to one or more illustrative embodiments.

FIG. 7 depicts an intelligent data simulation methodology 700 according to one or more illustrative embodiments. As shown step 702 simulates a first data set stored in a first database to create a second data set, wherein the second data set maintains one or more query impacting characteristics of the first data set such that performing a query on the second data set yields a performance result similar to another performance result that would occur when the query is performed on the first data set. Step 704 loads the second data set into a second database. Step 706 performs the query on the second data set stored in the second database to obtain the performance result. Performance testing can include, but is not limited to, one or more of capacity testing, load testing, volume testing, stress testing, and soak testing.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for intelligent data simulation will now be described in greater detail with reference to FIGS. 8 and 9. Although described in the context of information processing system 100, these platforms may also be used to implement at least portions of other information processing systems in other embodiments.

Figure 8:
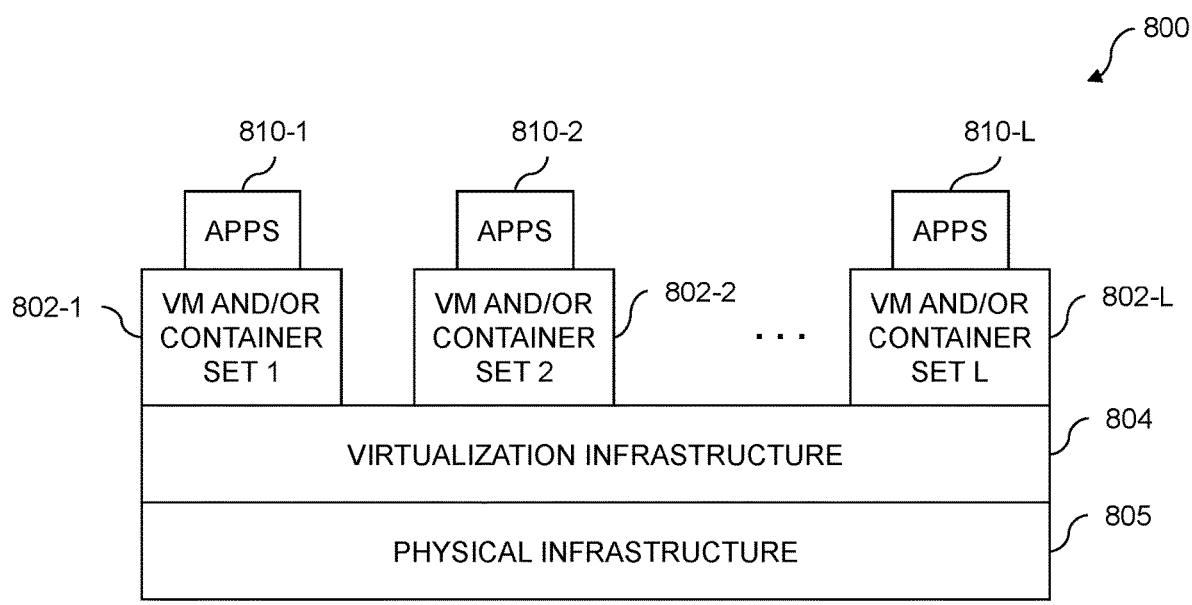
FIGS. 8 and 9 depict examples of processing platforms that may be utilized to implement at least a portion of an information processing system in illustrative embodiments.
Figure 9:
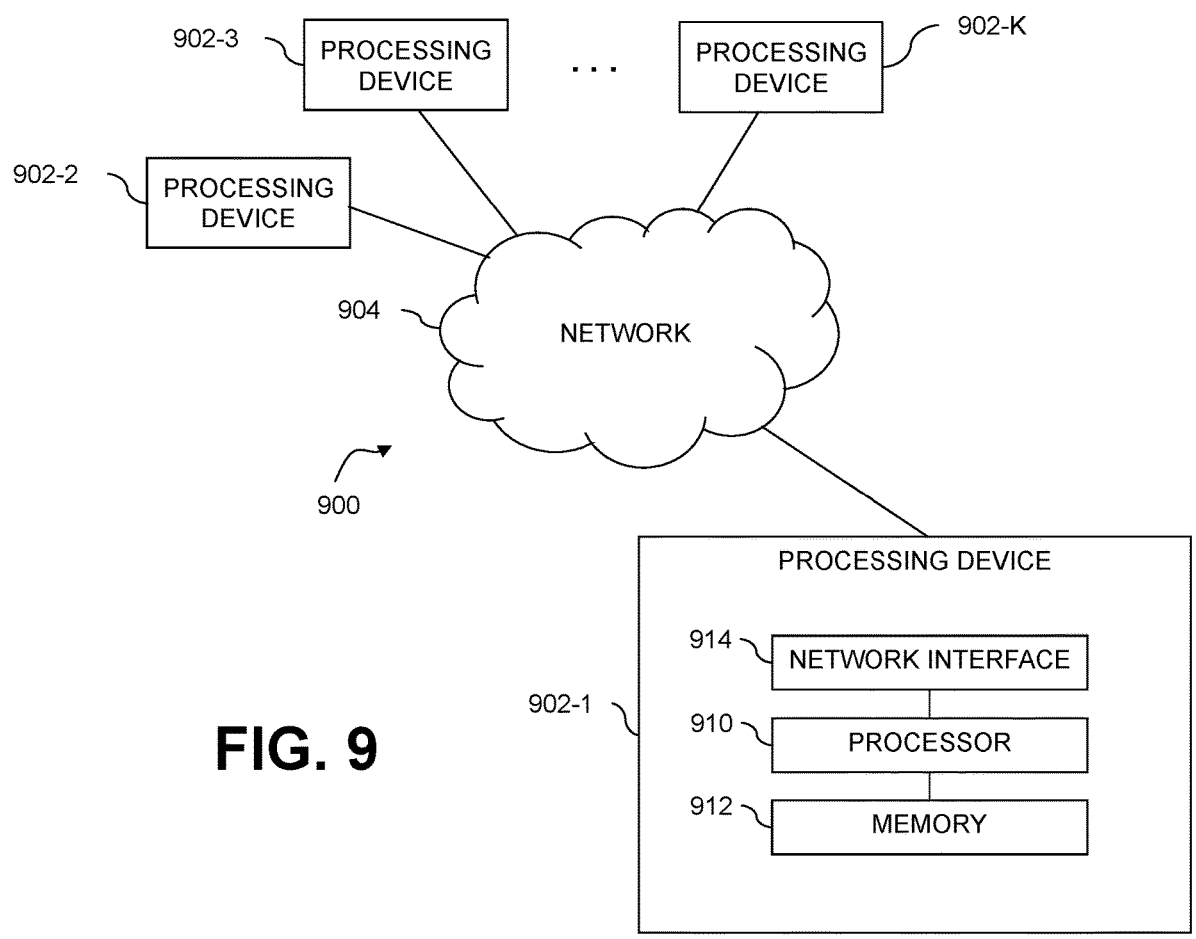

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2 . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of information processing system 100 and includes a plurality of processing devices, denoted 902-1, 902-2, 902-3 . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for intelligent data simulation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, databases, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processor and at least one memory storing computer program instructions wherein, when the at least one processor executes the computer program instructions, the apparatus is configured to:
    obtain one or more query impacting characteristics, the one or more query impacting characteristics comprising a behavioral data set obtained from a first data set stored in a first database and a data structure parameter data set obtained from a second database, the data structure parameter data set comprising one or more partition types and one or more index types;
    simulate the first data set stored in the first database to create a second data set stored in the second database, wherein the second data set maintains the one or more query impacting characteristics of the first data set, wherein performing a query on the second data set yields a performance result similar to another performance result that would occur when the query is performed on the first data set, and wherein a second query response time for performing the query on the second data set is equal to a first query response time for performing the query on the first data set;
    load the second data set into the second database; and
    perform the query on the second data set stored in the second database to obtain the performance result.

2. The apparatus of claim 1, wherein the first data set and the second data set comprise data structure parameters that are at least similar.

3. The apparatus of claim 2, wherein, when simulating the first data set to create the second data set, the apparatus is further configured to:
    identify the data structure parameters based on the data structure parameter data set; and
    suggest data for the second data set based on the identified data structure parameters.

4. The apparatus of claim 1, wherein the one or more partition types comprise a list partition type, a range partition type, and a hash partition type.

5. The apparatus of claim 1, wherein the one or more index types comprise a primary key index type, a foreign key index type, a unique key index type, and a non-unique index key type.

6. The apparatus of claim 3, wherein data suggested for the second data set based on the identified data structure parameters comprises one or more of: (i) sequence data; (ii) index data: (iii) partition data; (iv) list data; (v) data from the first data set; (vi) scrambled data; (vii) random data; and (viii) synthetic data.

7. The apparatus of claim 3, wherein, when simulating the first data set to create the second data set, the apparatus is further configured to enable at least one of user acceptance and user modification of data suggested for the second data set.

8. The apparatus of claim 7, wherein, when simulating the first data set to create the second data set, the apparatus is further configured to enable generation of user-defined data for the second data set.

9. The apparatus of claim 8, wherein, when simulating the first data set to create the second data set, the apparatus is further configured to generate the second data set from the data suggested and subject to user acceptance or user modification.

10. The apparatus of claim 3, wherein the suggested data for the second data set comprises one or more of: (i) a data count for partitions and indexes; (ii) a data count for columns not present in the partitions and the indexes; (iii) behavioral data representing one or more of a minimum data length, a maximum data length, and index keys; (iv) a data distribution representing the partitions and the indexes; and (v) a delta representing a difference between a data count in the first database and a data count in the second database.

11. The apparatus of claim 2, wherein one or more of the data structure parameters are specified according to a database metadata definition.

12. The apparatus of claim 1, wherein the first database comprises a production database and the second database comprises a performance testing database.

13. A computer program product comprising a non-transitory processor-readable storage medium having stored therein program code of one or more software programs, wherein the program code when executed by at least one processing device causes the at least one processing device to:
    obtain one or more query impacting characteristics, the one or more query impacting characteristics comprising a behavioral data set obtained from a first data set stored in a first database and a data structure parameter data set obtained from a second database, the data structure parameter data set comprising one or more partition types and one or more index types;
    simulate the first data set stored in the first database to create a second data set stored in the second database, wherein the second data set maintains the one or more query impacting characteristics of the first data set, wherein performing a query on the second data set yields a performance result similar to another performance result that would occur when the query is performed on the first data set, and wherein a second query response time for performing the query on the second data set is equal to a first query response time for performing the query on the first data set;

load the second data set into the second database; and perform the query on the second data set stored in the second database to obtain the performance result.

14. The computer program product of claim 13, wherein the first data set and the second data set comprise data structure parameters that are at least similar.

15. The computer program product of claim 14, wherein, when simulating the first data set to create the second data set, the program code when executed by at least one processing device further causes the at least one processing device to:

identify the data structure parameters based on the data structure parameter data set; and suggest data for the second data set based on the identified data structure parameters.

16. The computer program product of claim 13, wherein, when simulating the first data set to create the second data set, the program code when executed by at least one processing device further causes the at least one processing device to:

enable at least one of user acceptance and user modification of data suggested for the second data set; and generate the second data set from the data suggested and subject to user acceptance or user modification.

17. A method comprising:

obtaining one or more query impacting characteristics, the one or more query impacting characteristics comprising a behavioral data set obtained from a first data set stored in a first database and a data structure parameter data set obtained from a second database, the data structure parameter data set comprising one or more partition types and one or more index types;

simulating the first data set stored in the first database to create a second data set stored in the second database, wherein the second data set maintains the one or more query impacting characteristics of the first data set, wherein performing a query on the second data set yields a performance result similar to another performance result that would occur when the query is performed on the first data set, and wherein a second query response time for performing the query on the second data set is equal to a first query response time for performing the query on the first data set;

loading the second data set into the second database; and performing the query on the second data set stored in the second database to obtain the performance result;

wherein the method is performed by at least one processing device comprising a processor coupled to a memory.

18. The method of claim 17, wherein the first data set and the second data set comprise data structure parameters that are at least similar and further wherein simulating the first data set to create the second data set further comprises:

identifying the data structure parameters based on the data structure parameter data set;

suggesting data for the second data set based on the identified data structure parameters;

enabling at least one of user acceptance and user modification of data suggested for the second data set; and generating the second data set from the data suggested and subject to user acceptance or user modification.

* * * * *